United States Patent
Porter et al.

(10) Patent No.: US 11,154,794 B2
(45) Date of Patent: Oct. 26, 2021

(54) SAMPLING PUMPS AND CLOSED LOOP CONTROL OF SAMPLING PUMPS TO LOAD TRAPS

(71) Applicant: PERKINELMER HEALTH SCIENCES, INC., Waltham, MA (US)

(72) Inventors: Nathan L. Porter, Kaysville, UT (US); Anthony D. Rands, Orem, UT (US); Randal W. Waite, Springville, UT (US); Kenneth D. Nemelka, Alpine, UT (US); Chad B Grant, Sarotoga Springs, UT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 456 days.

(21) Appl. No.: 15/728,390

(22) Filed: Oct. 9, 2017

(65) Prior Publication Data

US 2018/0140970 A1 May 24, 2018

Related U.S. Application Data

(60) Provisional application No. 62/406,360, filed on Oct. 10, 2016.

(51) Int. Cl.
| | | |
|---|---|---|
| B01D 15/12 | (2006.01) |
| B01D 59/44 | (2006.01) |
| G01F 1/72 | (2006.01) |
| G01N 1/22 | (2006.01) |
| G01N 1/24 | (2006.01) |
| G01N 1/40 | (2006.01) |
| G01N 30/30 | (2006.01) |

(Continued)

(52) U.S. Cl.
CPC ............ *B01D 15/12* (2013.01); *B01D 59/44* (2013.01); *G01F 1/72* (2013.01); *G01N 1/2214* (2013.01); *G01N 1/24* (2013.01); *G01N 1/40* (2013.01); *G01N 15/0826* (2013.01); *G01N 30/30* (2013.01); *G01N 30/96* (2013.01); *G01N 2001/2297* (2013.01); *G01N 2030/025* (2013.01); *G01N 2030/128* (2013.01); *G01N 2030/626* (2013.01)

(58) Field of Classification Search
CPC ..................................................... B01D 15/12
USPC ....................................................... 73/31.01
See application file for complete search history.

(56) References Cited

U.S. PATENT DOCUMENTS

| | | | | |
|---|---|---|---|---|
| 4,376,172 A | * | 3/1983 | Belangee | .............. B29C 67/246 |
| | | | | 222/55 |
| 5,271,903 A | | 12/1993 | Durst | |

(Continued)

FOREIGN PATENT DOCUMENTS

EP 0416976 A1 3/1991

OTHER PUBLICATIONS

ISR/WO for PCT/US17/55798 dated Jan. 5, 2018.
ESSR and Search Opinion for EP17859664.9.

*Primary Examiner* — Walter L Lindsay, Jr.
*Assistant Examiner* — Philipmarcus T Fadul
(74) *Attorney, Agent, or Firm* — Rhodes IP PLC; Christopher Rhodes (57) ABSTRACT

Certain configurations of devices and systems which are configured to draw a selected volume of an air sample into a trap are described. In some examples, the devices and systems comprise a pump and a mass flow sensor to draw a selected volume of the air sample through a trap even where variable restriction occurs.

20 Claims, 6 Drawing Sheets

(51) Int. Cl.
*G01N 30/96* (2006.01)
*G01N 15/08* (2006.01)
G01N 30/62 (2006.01)
G01N 30/02 (2006.01)
G01N 30/12 (2006.01)

(56) References Cited

U.S. PATENT DOCUMENTS

| | | |
|---|---|---|
| 5,553,507 A | 9/1996 | Basch |
| 5,597,535 A * | 1/1997 | Schaedlich .......... G01N 1/2214 |
| | | 422/116 |
| 5,621,180 A | 4/1997 | Simon |
| 5,966,422 A | 12/1999 | Buck |
| 6,193,286 B1 | 2/2001 | Jones |
| 6,794,044 B2 | 9/2004 | Jones |
| 7,375,320 B2 | 5/2008 | Lee |
| 9,053,919 B2 | 6/2015 | Lammert |
| 9,322,750 B2 | 4/2016 | Oliphant |
| 9,588,034 B1 | 3/2017 | Bonsteel |
| 9,640,374 B2 | 5/2017 | Oliphant |
| 2004/0151622 A1 * | 8/2004 | Tseng .................... G01N 21/05 |
| | | 422/52 |
| 2005/0040327 A1 | 2/2005 | Lee |
| 2005/0193802 A1 | 9/2005 | Tipler |
| 2006/0016245 A1 | 1/2006 | Tipler |
| 2006/0094118 A1 | 5/2006 | Tipler |
| 2012/0267523 A1 | 10/2012 | Lammert |
| 2012/0329166 A1 * | 12/2012 | Skarping ................... G01F 1/68 |
| | | 436/106 |
| 2013/0233054 A1 | 9/2013 | Oliphant |
| 2013/0238253 A1 | 9/2013 | Oliphant |
| 2017/0131243 A1 | 5/2017 | Lee |
| 2017/0370888 A1 | 12/2017 | Lee |

* cited by examiner

FIG. 9

SAMPLING PUMPS AND CLOSED LOOP CONTROL OF SAMPLING PUMPS TO LOAD TRAPS

PRIORITY APPLICATION

This application claims priority to, and the benefit of, U.S. Provisional Application No. 62/406,360 filed on Oct. 10, 2016, the entire disclosure of which is hereby incorporated herein by reference for all purposes.

STATEMENT REGARDING FEDERALLY SPONSORED RESEARCH

This invention was made with government support under Contract No. D14PC00159 awarded by the U.S. Department of Interior. The government has certain rights in the invention.

TECHNOLOGICAL FIELD

This application is directed to sampling pumps and closed loop control of the sampling pump to load one or more samples onto a trap. In some instances, the closed loop control comprises use of a mass flow sensor to control the volume of air sample drawn through the trap independent of any variable restriction.

BACKGROUND

A trap can be used to trap analyte materials in an air sample. Traps include conventional traps, which are typically used when large volumes of sample are captured, and needle traps. Where needle traps are used, high variable restrictions in air flow can cause premature failure of the pump or inaccurate flows by the pump when drawing an air sample through a needle trap to load the analyte onto a sorbent material in the needle trap.

SUMMARY

Certain aspects are described below in reference to a sampling pump and its control to permit loading of an air sample into a needle trap or other trap with high variable restriction. The pumps can be configured to fluidically couple to a trap and pull air through the trap without failing and with more consistent flows than existing pumps. While various configurations are described, control of the pump may be based, at least in part, on the use of a mass flow sensor to ensure accurate measurements of the moles of air passing through the pump and drawn through the trap.

In one aspect, a system configured to draw air through a trap to load analyte in an air sample onto the trap is described. In one configuration, the system comprises a pump configured to fluidically couple to the trap through a fluid flow line and configured to draw the air sample through the trap, a mass flow sensor fluidically coupled to the fluid flow line and configured to measure mass flow in the air sample drawn through the trap, and a controller electrically coupled to the pump and the mass flow sensor, the controller configured to provide closed loop control of the pump from mass flow measurements by the mass flow sensor to draw a selected volume of the air sample through the trap.

In certain examples, the controller is configured to correct for atmospheric pressure and temperature during operation of the pump. In other examples, the controller is configured to adjust a pumping rate of the pump using the mass measurements and corrected atmospheric pressure and temperature from the mass flow device. In some embodiments, the controller is configured to automatically adjust a pumping rate of the pump using the mass measurements and the corrected atmospheric pressure and temperature to provide a selected volume of the air sample to be drawn through the trap. In some examples, the fixed volume of the air sample drawn onto the trap is determined without measuring a pressure change in the system. In certain configurations, the controller is configured to compare the mass measurements to a calibration table to determine the volume of species drawn onto the trap. In some examples, the system comprises a barometric sensor electrically coupled to the controller. In certain instances, the controller is configured to determine atmospheric pressure and temperature using the barometric sensor and alter a pumping rate of the pump using the determined atmospheric pressure and temperature and the mass measurements. In some configurations, the controller is configured to fluidically decouple the pump from the trap after a determined volume of the air sample has drawn through the trap. In certain examples, the controller is configured to discontinue pumping of the pump after a determined volume of the air sample has been drawn onto the trap. In other embodiments, the controller is configured to load a selected amount of analyte onto the trap based on the mass flow measurements and without considering a flow rate of the pump. In some examples, the controller is configured to load a selected amount of analyte on the trap based on the mass flow measurements and without considering a pumping time of the pump. In certain embodiments, the system comprises a wireless device electrically coupled to the controller. In some examples, the wireless device comprises a Bluetooth device or an antenna. In certain instances, the system comprises a power source. For example, the power source can be selected from the group consisting of an alternating current source, a direct current source, a battery, a rechargeable battery, an electrochemical cell, a fuel cell, a solar cell and a hand crank generator. In some examples, the system comprises a memory unit electrically coupled to the controller. In other examples, the system comprises a display screen electrically coupled to the controller. In certain instances, the controller is configured to provide a summary of operation on the display comprising at least one of total time, pump time, total volume, average volume, repetitions and pump status. In some examples, the controller is configured to permit operation of the pump for a selected period based on at least one of time, flow and volume through the mass flow sensor to drawn a selected volume of the air sample onto the trap.

In another aspect, a system configured to load analyte in an air sample onto a trap comprises a pump comprising a fluid inlet configured to fluidically couple to the trap to draw analyte in the air sample onto the trap, a mass flow sensor in a fluid flow line between the trap and the fluid inlet of the pump, the mass flow sensor configured to measure mass flow in the air sample drawn through the trap, a barometric sensor fluidically coupled to external atmosphere and configured to determine pressure and temperature of the external atmosphere, and a controller electrically coupled to the pump, the mass flow sensor and the barometric sensor, the controller configured to use the determined atmospheric pressure and temperature and the measured mass flow during pump operation and adjust a pump flow rate during loading of analyte onto the trap to draw a selected volume of the air sample through the trap and load the analyte in the air sample onto the trap.

In certain examples, the controller is configured to compare the measured mass flow to a calibration table to determine the volume of the air sample drawn through the trap. In other examples, the controller is configured to fluidically decouple the pump from the trap after a selected volume of the air sample has been drawn through the trap. In some examples, the controller is configured to discontinue pumping of the pump after a selected volume of the air sample has been drawn through the trap. In other examples, the system comprises a wireless device electrically coupled to the controller. In certain configurations, the wireless device comprises a Bluetooth device or an antenna. In some embodiments, the system comprises a power source. In other examples, the power source is selected from the group consisting of an alternating current source, a direct current source, a battery, a rechargeable battery, an electrochemical cell, a fuel cell, a solar cell and a hand crank generator. In some embodiments, the system comprises a memory unit and a display screen each electrically coupled to the controller. In other instances, the controller is configured to permit operation of the pump for a selected period based on at least one of time, flow and volume through the mass flow sensor.

In another aspect, a portable system configured to load gaseous analyte in an air sample onto an external trap comprises a housing comprising a fluid inlet configured to fluidically couple to the external trap comprising a sorbent material within the external trap, a pump in the housing, in which the pump is configured to fluidically couple to the external trap through a fluid flow line between the pump and the fluid inlet of the housing, the pump configured to draw the air sample through the external trap to load gaseous analyte onto the sorbent material of the external trap, a mass flow sensor in the housing and fluidically coupled to the fluid flow line, the mass flow sensor configured to measure mass flow in the fluid flow drawn through the external trap, and a controller in the housing and electrically coupled to the pump and the mass flow sensor, the controller configured to provide closed loop control of the pump from mass flow measurements by the mass flow sensor to draw a selected volume of the air sample through the external trap.

In certain configurations, the controller is configured to compare the measured mass flow to a calibration table to determine the volume of the air sample drawn through the external trap. In some embodiments, the controller is configured to fluidically decouple the pump from the external trap after a selected volume of the air sample has been drawn through the external trap. In other examples, the controller is configured to discontinue pumping of the pump after a selected volume of the air sample has been drawn through the external trap. In some instances, the system comprises a wireless device in the housing and electrically coupled to the controller. In other examples, the wireless device comprises a Bluetooth device or an antenna. In certain embodiments, the system comprises a power source in the housing or in which the housing comprises external couplers configured to couple to a power source. In some instances, the power source is selected from the group consisting of an alternating current source, a direct current source, a battery, a rechargeable battery, an electrochemical cell, a fuel cell, a solar cell and a hand crank generator. In some examples, the system comprises a memory unit in the housing and a display screen on the housing, in which each of the memory unit and the display screen is electrically coupled to the controller. In other examples, the controller is configured to permit operation of the pump for a selected period based on at least one of time, flow and volume through the mass flow sensor.

In an additional aspect, a portable system configured to load gaseous analyte in an air sample onto an external trap comprises a housing comprising a fluid inlet configured to fluidically couple to the external trap comprising a sorbent material within the external trap, a pump in the housing, in which the pump is configured to fluidically couple to the external trap through a fluid flow line between the pump and the fluid inlet of the housing, the pump configured to draw the air sample through the external trap to load analyte in the air sample onto the external trap, a mass flow sensor in the housing and fluidically coupled to the fluid flow line, the mass flow sensor configured to measure mass flow in the air sample drawn through the external trap, a barometric sensor in the housing and fluidically coupled to external atmosphere and configured to determine pressure and temperature of the external atmosphere, and a controller in the housing and electrically coupled to the pump, the mass flow sensor and the barometric sensor, the controller configured to use the determined atmospheric pressure and temperature and the measured mass flow during pump operation and adjust a pump flow rate during loading of analyte onto the sorbent material of the external trap to draw a selected volume of the air sample through the external trap to load the analyte onto the external trap.

In certain instances, the controller is configured to compare the measured mass flow to a calibration table to determine the volume of the air sample drawn through the external trap. In other examples, the controller is configured to fluidically decouple the pump from the external trap after a selected volume of the air sample has been drawn through the external trap. In some embodiments, the controller is configured to discontinue pumping of the pump after a selected volume of the air sample has been drawn through the external trap. In certain examples, the system comprises a wireless device in the housing and electrically coupled to the controller. In some examples, the wireless device comprises a Bluetooth device or an antenna. In other examples, the system comprises a power source in the housing or in which the housing comprises external couplers configured to couple to a power source. In certain configurations, the power source is selected from the group consisting of an alternating current source, a direct current source, a battery, a rechargeable battery, an electrochemical cell, a fuel cell, a solar cell and a hand crank generator. In some examples, the system comprises a memory unit in the housing and a display screen on the housing, in which each of the memory unit and the display screen is electrically coupled to the controller. In other examples, the controller is configured to permit operation of the pump for a selected period based on at least one of time, flow and volume through the mass flow device.

In another aspect, a method of loading analyte in an air sample onto a trap is described. In certain embodiments, the method comprises measuring mass flow in the air sample drawn through the trap using a negative pressure from a pump fluidically coupled to the trap, determining a volume of the air sample drawn through the trap using the measured mass flow, and discontinuing drawing of the air sample through the trap once the determined volume of the air sample drawn through the trap reaches a selected volume.

In certain examples, the method comprises determining atmospheric pressure and temperature during use of the negative pressure from the pump to determine a corrected mass flow through the trap. In other examples, the method comprises adjusting a pumping rate of the pump using the corrected mass flow through the trap to draw the determined volume of the air sample through the trap. In some embodiments, the method comprises drawing the air sample through the trap without measuring a pressure drop. In some examples, the method comprises using a controller to compare the determined volume of the air sample drawn through the trap and the corrected mass flow through the trap to a calibration table to determine when the selected volume of the air sample drawn through the trap is reached. In certain embodiments, the method comprises altering a pumping rate of the pump using the determined atmospheric pressure and temperature and the mass measurements. In some examples, the method comprises calculating a volume of the air sample drawn through the trap using the atmospheric pressure and temperature. In certain examples, the method comprises displaying on a display screen a summary of operation comprising at least one of total time, pump time, total volume, average volume, repetitions and pump status. In some embodiments, the method comprises wirelessly transmitting the summary to an external device separate from the trap. In certain instances, the method comprises comparing a volume of the air sample drawn through the trap to a calibration table and adjusting a pumping rate of the pump to a higher pumping rate if the compared volume of the air sample drawn through the trap is lower than a threshold value.

In another aspect, an instrument comprises a pump configured to fluidically couple to an external trap through a fluid flow line and configured to draw the air sample through the trap, a mass flow sensor fluidically coupled to the fluid flow line and configured to measure mass flow in the air sample drawn through the trap, a controller electrically coupled to the pump and the mass flow sensor, the controller configured to provide closed loop control of the pump from mass flow measurements by the mass flow sensor to draw a selected volume of the air sample through the trap, and a thermal desorption system comprising an inlet configured to fluidically couple to the trap to receive analyte trapped on the trap which is desorbed from the trap by the thermal desorption system.

In certain embodiments, the controller is configured to compare the measured mass flow to a calibration table to determine the volume of the air sample drawn through the external trap. In other embodiments, the controller is configured to fluidically decouple the pump from the external trap after a selected volume of the air sample has been drawn through the external trap. In some examples, the controller is configured to discontinue pumping of the pump after a selected volume of the air sample has been drawn through the external trap. In certain configurations, the instrument comprises a wireless device electrically coupled to the controller, e.g., a Bluetooth device or an antenna. In other examples, the instrument comprises a portable power source. In certain embodiments, the power source is selected from the group consisting of an alternating current source, a direct current source, a battery, a rechargeable battery, an electrochemical cell, a fuel cell, a solar cell and a hand crank generator. In some examples, the controller is configured to permit operation of the pump for a selected period based on at least one of time, flow and volume through the mass flow sensor. In some instances, the thermal desorption system comprises an oven and a detector.

In another aspect, an instrument comprises a pump configured to fluidically couple to a trap through a fluid flow line and configured to draw the air sample through the trap, a mass flow sensor fluidically coupled to the fluid flow line and configured to measure mass flow in the air sample drawn through the trap, a controller electrically coupled to the pump and the mass flow sensor, the controller configured to provide closed loop control of the pump from mass flow measurements by the mass flow sensor to draw a selected volume of the air sample through the trap, and a detector comprising an inlet configured to fluidically couple to the trap to receive analyte trapped on the trap and which is desorbed from the trap and provided to the detector.

In certain configurations, the controller is configured to compare the measured mass flow to a calibration table to determine the volume of the air sample drawn through the external trap. In other configurations, the controller is configured to fluidically decouple the pump from the external trap after a selected volume of the air sample has been drawn through the external trap. In some examples, the controller is configured to discontinue pumping of the pump after a selected volume of the air sample has been drawn through the external trap. In other examples, the instrument comprises a wireless device electrically coupled to the controller, e.g., a Bluetooth device or an antenna. In certain embodiments, the instrument comprises a portable power source. In some examples, the power source is selected from the group consisting of an alternating current source, a direct current source, a battery, a rechargeable battery, an electrochemical cell, a fuel cell, a solar cell and a hand crank generator. In certain instances, the controller is configured to permit operation of the pump for a selected period based on at least one of time, flow and volume through the mass flow sensor. In other instances, the detector is a mass spectrometer. In some configurations, the instrument further comprises a gas chromatography system fluidically coupled to the mass spectrometer, in which the gas chromatography system is configured to receive desorbed analyte flow from the trap, separate analyte species in the desorbed analyte flow and provide the separated analyte species to the mass spectrometer.

In another aspect, a method of trapping analyte in an air sample onto sorbent material of an external trap comprises using closed loop control and measurements from a mass flow sensor to control a pumping rate of a pump fluidically coupled to the external trap to draw a selected volume of the air sample through the external trap and trap analyte onto the sorbent material of the trap.

Additional aspects, examples and embodiments are described in more detail below.

BRIEF DESCRIPTION OF THE SEVERAL VIEWS OF THE FIGURES

Certain configurations of sampling pumps, sampling pump systems and systems and methods used to control the sampling pump and sampling pump systems are described with reference to the accompanying figures in which.

It will be recognized by the person of ordinary skill in the art, given the benefit of this disclosure that the positions and arrangement of the components shown in the figures is not fixed or critical. The components can be arranged to achieve a desired shape, form factor, positioning, etc. to provide a sampling system as described herein.

DETAILED DESCRIPTION

Certain specific configurations of sampling pumps, sampling pump control and systems using the sampling pumps are described in more detail below. It will be recognized by the person of ordinary skill in the art, given the benefit of this disclosure, that the sampling pumps can be used in or with many different devices to load a sample onto a trap and/or to permit analysis of the loaded sample using one or more other devices.

In certain embodiments, the systems described herein may comprise a high vacuum pump that can pull air through needle traps without failing and at better flows than current pumps. In some configurations, the system comprises a mass flow sensor, which when compared to an external volume calibration curve can be configured to convert the mass flow measurement from mass to volume for closed loop control which allows for the use with variable restriction devices without loss of accuracy in volume collected. This configuration also includes an atmospheric pressure and temperature sensor which allows for correction of the mass flow to provide accurate volumetric flow measurement at all pressure and temperature conditions. The pump can be configured to automatically adjust the pumping rate to ensure the correct volume will be drawn through the trapping device independent of restriction. Without wishing to be bound by any particular theory, the actual volume of air pulled through the trapping device can be controlled. If the flow calibration is incorrect because of a change in restriction then the actual volume collected can vary in conventional pumps. For example, existing pumps often use simple pressure measurements expecting the restriction of the trapping device to remain constant allowing for conversion from pressure to flow. If the restriction on the inlet of the pump changes (which is common) then the pressure being measured no longer is an accurate indication of flow rate. By using a mass flow sensor in the sampling systems described herein accurate measurement of moles of air can be performed to account for variable restriction. The mass is converted to volume by using correlating the mass flow sensor measurements to actual volume of air. The calibration includes, for example, the atmospheric pressure and temperature collected from a barometric sensor or chip. By continuing to monitor the atmospheric pressure and temperature, the mass being pulled through the trapping device can be converted to volume at any elevation or temperature and over variable restriction. Quantitation is based on volume not time or flow rate. By allowing time to float, the sampling pump will operate for the appropriate amount of time to get the specified volume onto the trap. This result occurs independently of the actual flow. For example, if the restriction on the inlet of the pump is too great for the pump to reach the set flow, it still does not negatively affect the accuracy of the volume collected. The pump will run for sufficient time to reach the target volume making up for the lower flow rate due to the high restriction.

In some examples, the systems and methods described herein may measure the entire response and sum the responses. In contrast to systems that may measure individual pulses, by measuring and summing the responses, averaging and/or smoothing operations can be avoided if desired. By measuring and summing the responses, more accurate volumes of air drawn through one or more components of the system can be controlled. For example, use of a constant flow by itself may not necessarily provide an accurate measure of the volume of air drawn through one or more components of the system, e.g., the volume of an air sample drawn through a trap where variable restriction may be encountered. The systems and methods described herein can be used to provide closed loop control of the pump from mass flow measurements by the mass flow sensor, and optionally using other measurements as noted below, to draw a selected volume of an air sample through the trap or other component of the system even when variable restriction may occur. Drawing of selected air volumes, e.g., over a selected window of time or duration, can permit for more accurate loading of samples using the sampling devices, systems and methods described herein.

In other instances, the systems described herein can be designed as stand-alone systems which can function in remote areas outside of traditional buildings and facilities without the need to connect or couple to other components, devices or systems to be operable. The system may function, for example, by itself without the need to use other components or couple other components to the system prior to using the system. The system may be sized and arranged, for example, as a hand-held device, a portable device about the size of a laptop, brief-case or small piece of luggage or other sizes which readily permit a user to transport the device from one location to another location. As noted herein, the entire system can be powered by a remote power source such as a battery or other DC power sources.

Figure 1:
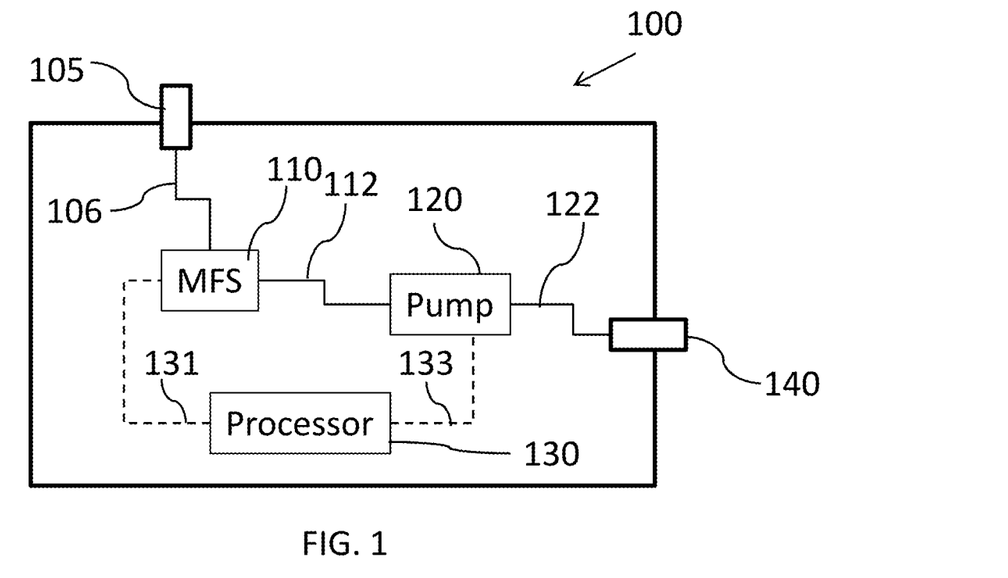
FIG. 1 is an illustration of a sampling system comprising a pump, a mass flow sensor and a processor, in accordance with certain embodiments.

In certain configurations and referring to FIG. 1, a system 100 comprises an inlet 105 fluidically coupled to a pump 120. The inlet 105 is also configured to fluidically couple to a trap (not shown) pump 120. A mass flow sensor (MFS) 110 is present in a fluid line 112 between the inlet 105 and the pump 120 and is fluidically coupled to the inlet 105 through a fluid line 106. The mass flow sensor 110 and the pump 120 are electrically coupled to a processor 130 through interconnects 131, 333, respectively. If desired, however, the sensor 110 and pump 120 could be electrically coupled to the processor 130 in a wireless manner. The pump 120 is fluidically coupled to an exit 140 through a fluid line 122. In use of the system 100, a trap (not shown) can be fluidically coupled to the inlet 105 directly or an interface (as discussed below) may be present between the inlet 105 and the trap. The pump 120 is switched on and the pump time, flow rate, etc. are controlled by the processor 130 based on the processor determining the number of moles of air provided through the trap using measurements from the mass flow sensor 110. In some instances, the pumping rate of the pump 120 is adjusted to ensure the correct volume is drawn through the trap independent of restriction. The actual volume of air drawn through the trap can be determined using the mass flow sensor 110 and the processor 130. For example, the measured mass flow from the mass flow sensor 110 can be converted to volume by the processor 130 by correlating the mass flow sensor measurements to actual volume of air. The calibration includes, for example, the atmospheric pressure and temperature collected from a barometric sensor (not shown in FIG. 1), which may be present in the mass flow sensor 110, the pump 120 or in one of the fluid lines 106, 112, 122. The atmospheric pressure and temperature can be continuously monitored to permit an accurate conversion of the mass to volume being pulled through the trap. Such calculations may be particularly beneficial where trap restriction varies or where pressure or elevation varies significantly at different sampling times. The actual mass drawn through the trap can be based on volume not pumping time or flow rate through the system 100. For example, the processor 130 can be configured to operate the sampling pump 120 for the appropriate amount of time to load the specified volume onto the trap. Once the appropriate volume is loaded onto the trap, the processor 130 can switch the pump 120 off or can fluidically decouple the trap from the pump 120 by actuating a valve or other internal component (not shown) to a position which stops fluid flow between the trap and the pump 120. The actual pumping rate implemented by the processor 130 can change or may be constant. In some examples, the processor 130 controls the pump 120 to provide a certain loaded volume onto the trap within a selected time. To reach such selected times, the processor 130 can use the mass measured by the mass flow sensor 110 and adjust the pumping rate to achieve the target time. If variable restriction is encountered during the pumping time, the processor 130 can adjust the pumping rate to account for the variable restriction. By using the mass flow sensor 110, the actual volume of air pulled through the trap is more accurate and reproducible even with changing pressure, temperature and flow restriction.

Figure 2:
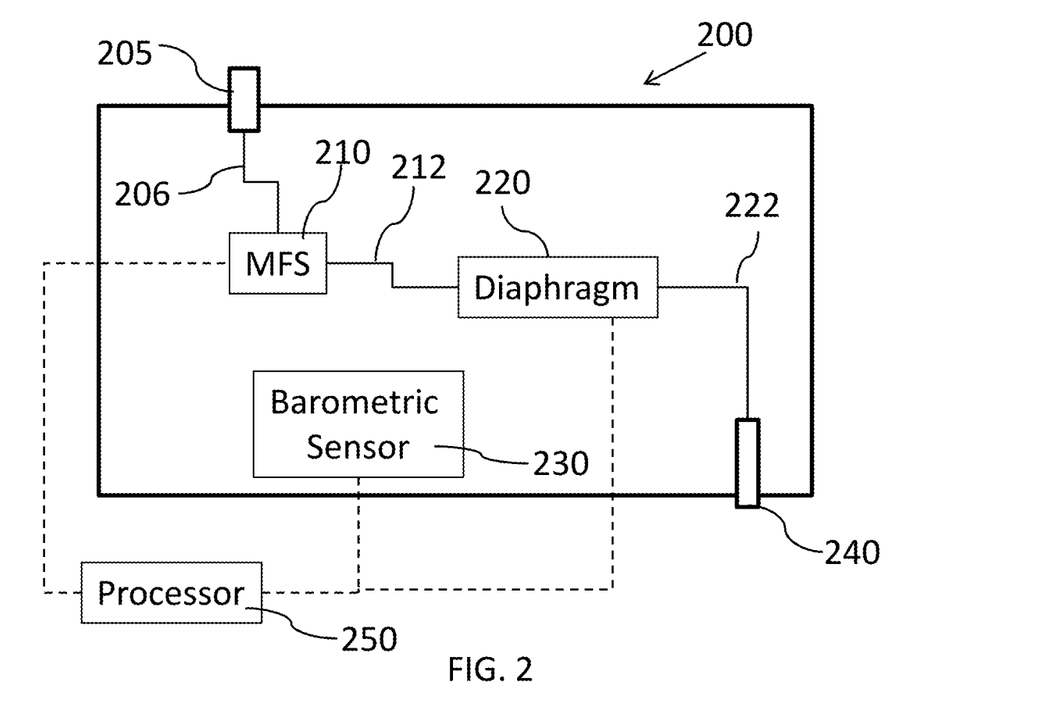
FIG. 2 is an illustration of a sampling system comprising a pump, a mass flow sensor, a barometric sensor and a processor, in accordance with certain embodiments.

In other configurations, the mass flow sensor need not be a separate component from the pump. For example, the mass flow sensor can be integrated into an internal fluid line of the pump. In addition, the processor may also be integrated into the pump if desired. An illustration of a pump with an integral mass flow sensor is shown in FIG. 2. The pump 200 comprises an inlet 205 and a mass flow sensor 210 fluidically coupled to the inlet 205 through a fluid line 206. A diaphragm 220 is fluidically coupled to the mass flow sensor 210 through a fluid line 212. A barometric sensor 230 is present within the pump 200 (though it could alternatively be present on an external surface of the system 200) and is fluidically coupled to the external atmosphere to determine pressure and temperature. An exit 240 fluidically coupled to the diaphragm 220 through a fluid line 222 is present which may comprise a valve (not shown) which can be actuated to an open or a closed position to alter the pressure provided by the pump 200. A processor 250 can be electrically coupled to each of the mass flow sensor 210, the diaphragm 220 and the barometric sensor 230 through various interconnects (dashed lines in FIG. 2). The processor 250 is shown as being external to the pump 200 but it may be integral to the pump if desired. In use of the pump 200, a trap (not shown) can be fluidically coupled to the inlet 205. The pump 200 is switched on (or may already be switched on) and the pump time, flow rate, etc. are controlled by the processor 250 based on the processor 250 determining the number of moles of air provided through the trap using measurements from the mass flow sensor 210 and the barometric sensor 230. In certain examples, the pumping rate of the pump 200 is adjusted to ensure the correct volume is drawn through the trap independent of restriction. The actual volume of air drawn through the trap can be determined using the mass flow sensor 210, the barometric sensor 230 and the processor 250. For example, the measured mass flow from the mass flow sensor 210 can be converted to volume by the processor 250 by correlating the mass flow sensor measurements to actual volume of air. The calibration includes, for example, the atmospheric pressure and temperature collected from the barometric sensor 230. The atmospheric pressure and temperature can be continuously monitored by the processor 250 to permit an accurate conversion of the mass to volume being pulled through the trap. For example, the molar volume of air ($V_m$) at any pressure or temperature can be calculated using the ideal gas law ($V_m=(RT)/p$ where R is the gas constant, T is the measured temperature and p is the measured pressure). A ratio between a calibrated pressure and temperature and the measured pressure and temperature can be used to apply a correction factor to the calibration of the system 200 to accurately determine the molar volume of air drawn through the trap. This correction factors permits calibration of the system 200 at any location and then correction of the calibration at a different location. Such calculations may be particularly beneficial where trap restriction varies or where pressure or elevation varies significantly at different sampling times. The actual mass drawn through the trap can be based on volume not pumping time or flow rate through the pump 200. For example, the processor 250 can be configured to operate the pump 200 for the appropriate amount of time to load the specified volume onto the trap. Once the appropriate volume is loaded onto the trap, the processor 250 can switch the diaphragm 220 off or can fluidically decouple the trap from the pump 200 by actuating a valve or other internal component (not shown) to a position which stops fluid flow between the trap and the pump 200. The actual pumping rate implemented by the processor 250 can change or may be constant during loading of the trap. In some examples, the processor 250 controls the pump 200 to provide a certain loaded volume onto the trap within a selected time. To reach such selected times, the processor 250 can use the mass measured by the mass flow sensor 210, any desired correction factor based on measurements from the sensor 230 and adjust the pumping rate to achieve the target time. If variable restriction is encountered during the loading of the trap, the processor 250 can adjust the pumping rate to account for the variable restriction. By using the mass flow sensor 210 and the barometric sensor 230, the actual volume of air pulled through the trap by the pump 200 is more accurate and reproducible even with changing pressure, temperature and flow restriction.

Figure 3:
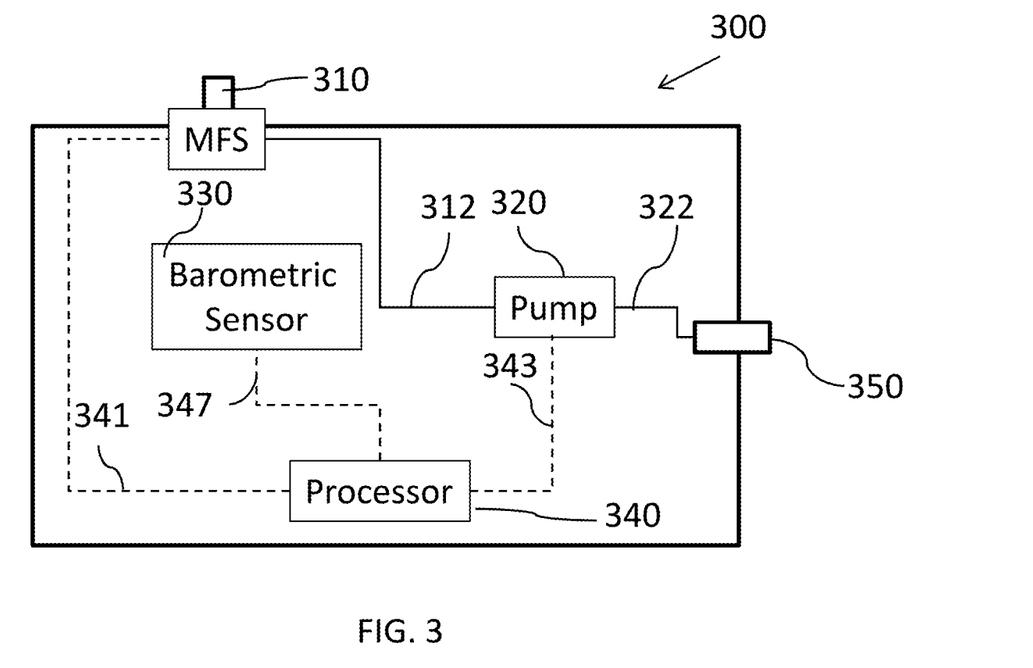
FIG. 3 is an illustration of a sampling system comprising mass flow sensor integrated into an inlet, in accordance with certain configurations.

In some configurations, the mass flow sensor may be integrated into the inlet of the sampling system. For example and referring to FIG. 3, a pump 300 comprises an inlet with an integrated mass flow sensor 310. A pump 320 is fluidically coupled to the mass flow sensor 310 through a fluid line 312. A barometric sensor 330 is present within the system 300 and is fluidically coupled to the external atmosphere to permit the sensor 330 to sense external pressure and temperature. A processor 340 is electrically coupled to each of the mass flow sensor 310, the pump 320 and the barometric sensor 330 through interconnects 341, 343 and 347, respectively. An exit 350 is present which can be actuated between an open and a closed position to alter the pressure within the system 300. The pump 320 is switched on (or may already be switched on) and the pump time, flow rate, etc. are controlled by the processor 340 based on the processor 340 determining the number of moles of air provided through the trap using measurements from the mass flow sensor 310 and/or the barometric sensor 330. In certain instances, the pumping rate of the pump 320 is adjusted to ensure the correct volume is drawn through the trap independent of restriction and/or based on correction factors provided using measurements from the barometric sensor 330. The actual volume of air drawn through the trap can be determined using the mass flow sensor 310, the barometric sensor 330 and the processor 340. For example, the measured mass flow from the mass flow sensor 310 can be converted to volume by the processor 340 by correlating the mass flow sensor measurements (and using any desired correction factor based on measurements from the barometric sensor 330) to actual volume of air. The calibration includes, for example, the atmospheric pressure and temperature collected from the barometric sensor 330. The atmospheric pressure and temperature can be continuously monitored by the processor 340 (using the barometric sensor 330) to permit an accurate determination of the actual molar volume being pulled through the trap. Such calculations may be particularly beneficial where trap restriction varies or where pressure or elevation varies significantly at different sampling times. The actual mass drawn through the trap can be based on volume not pumping time or flow rate through the system 300. For example, the processor 340 can be configured to operate the pump 320 for the appropriate amount of time to load the specified volume onto the trap. Once the appropriate volume is loaded onto the trap, the processor 340 can switch the pump 320 off or can fluidically decouple the trap from the pump 320 by actuating a valve or other internal component (not shown) to a position which stops fluid flow between the trap and the pump 320. The actual pumping rate implemented by the processor 340 can change or may be constant during loading of the trap. In some examples, the processor 340 controls the pump 320 to provide a certain loaded volume onto the trap within a selected time. To reach such selected times, the processor 340 can use the mass measured by the mass flow sensor 310, apply any desired corrections based on measurement by the sensor 330 and adjust the pumping rate to achieve the target time. If variable restriction is encountered during the loading of the trap, the processor 340 can adjust the pumping rate to account for the variable restriction. By using the mass flow sensor 310 and the barometric sensor 330, the actual volume of air pulled through the trap by the pump 320 is more accurate and reproducible even with changing pressure, temperature and flow restriction.

Figure 4:
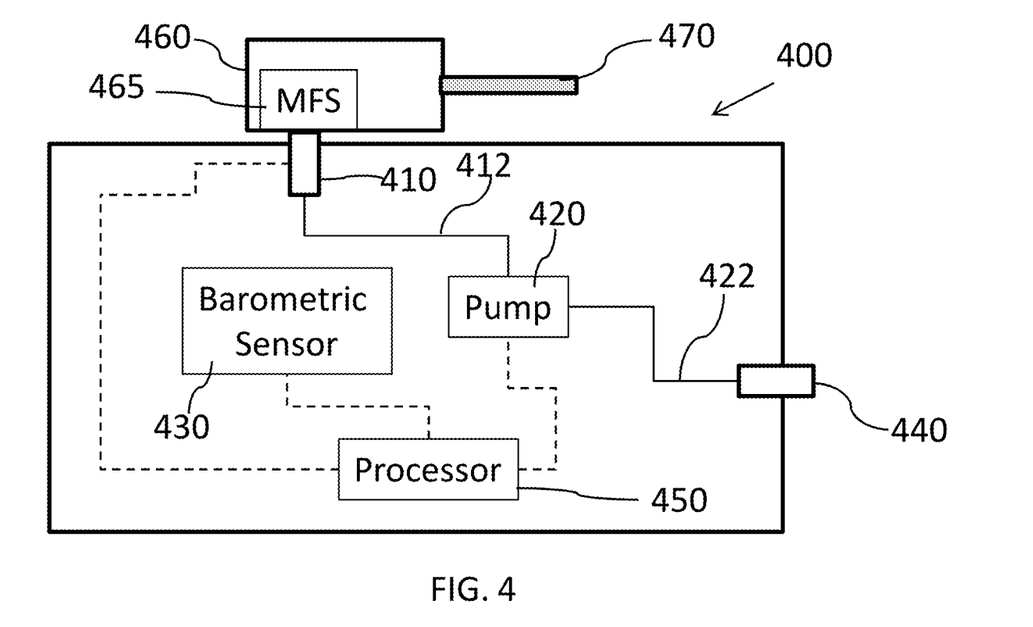
FIG. 4 is an illustration of a system comprising a mass flow sensor in an external interface configured to couple to the sampling system, in accordance with certain examples.

In other instances, the mass flow sensor may be present in an interface configured to couple to the sampling pump and the trap. The interface may be configured to receive air through one port and couple to a trap at another port. A third port can be present and used to couple the interface to the sampling pump system. In some configurations, the mass flow sensor may be downstream of the trap to provide a better measurement of the volume of air drawn through the trap. Referring to FIG. 4, a system 400 is shown that comprises an inlet 410 fluidically coupled to a pump 420 through a fluid line 412. The pump is 420 fluidically coupled to an exit port 440 through a fluid line 422. A barometric sensor 430 is fluidically coupled to the external atmosphere to determine atmospheric pressure and temperature at the particular location of the system 400. A processor 450 is present and electrically coupled to each of the inlet 410, the barometric sensor 430 and the pump 420 through interconnects (the dashed lines in FIG. 4). In particular, a mass flow sensor 465 present in an interface 460 configured to reversibly couple to the inlet 410 may electrically couple to the processor 450 when the interface 460 is coupled to the inlet 410. For example, electrical interconnects may be present on the interface 460 that electrically couple to electrical interconnects on the inlet 410 to provide electrical coupling between the mass flow sensor 465 and the processor 450. In an alternative configuration, the electrical interconnects could instead be replaced with wireless connections. A trap 470 is shown as being coupled to the interface 460. The pump 420 is controlled by the processor 450 based on the processor 450 determining the number of moles of air provided through the trap 470 using measurements from the mass flow sensor 465 of the interface 460 and using any correction factors from measurement by the barometric sensor 430. In certain instances, the pumping rate of the pump 420 is adjusted to ensure the correct volume is drawn through the trap 470 independent of restriction. The actual volume of air drawn through the trap 470 can be determined using the mass flow sensor 465, the barometric sensor 430 and the processor 450. For example, the measured mass flow from the mass flow sensor 465 can be converted to volume by the processor 450 by correlating the mass flow sensor measurements to actual volume of air. The calibration includes, for example, the atmospheric pressure and temperature collected from the barometric sensor 430. The atmospheric pressure and temperature can be continuously monitored by the processor 450 (using measurements from the barometric sensor 430) to permit an accurate determination of the molar volume being pulled through the trap 470. Such calculations may be particularly beneficial where trap restriction varies or where pressure or elevation varies significantly at different sampling times. The actual mass drawn through the trap 470 can be based on volume not pumping time or flow rate through the system 400. For example, the processor 450 can be configured to operate the pump 420 for the appropriate amount of time to load the specified volume onto the trap 470. Once the appropriate volume is loaded onto the trap 470, the processor 450 can switch the pump 420 off or can fluidically decouple the trap 470 from the pump 420 by actuating a valve or other internal component (not shown) to a position which stops fluid flow between the trap 470 and the pump 420. The actual pumping rate implemented by the processor 450 can change or may be constant during loading of the trap 470 depending on the restriction and/or changes senses by the barometric sensor 430. In some examples, the processor 450 controls the pump 420 to provide a certain loaded volume onto the trap 470 within a selected time. To reach such selected times, the processor 450 can use the mass measured by the mass flow sensor 465, apply any correction factors based on measurements from the barometric sensor 430 and adjust the pumping rate of the pump 420 to achieve the target time. If variable restriction is encountered during the loading of the trap 470, the processor 450 can adjust the pumping rate of the pump 420 to account for the variable restriction. By using the mass flow sensor 465 and the barometric sensor 430, the actual volume of air pulled through the trap 470 by the pump 420 is more accurate and reproducible even with changing pressure, temperature and flow restriction.

Figure 5:
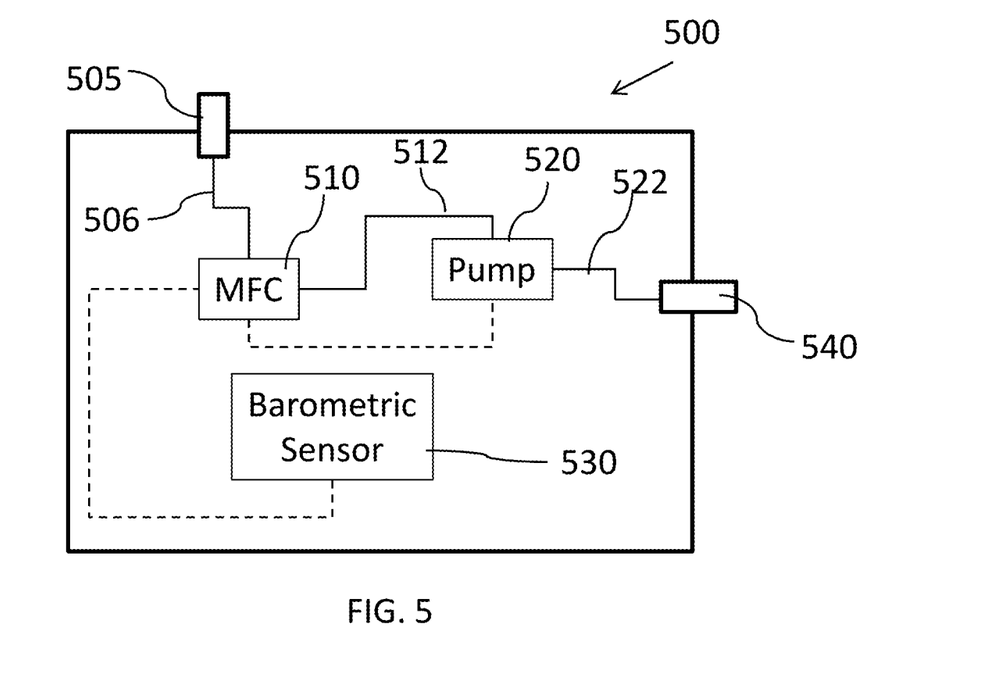
FIG. 5 is an illustration of a system comprising a mass flow controller, in accordance with certain configurations.

If desired, the processor of the system described herein can be integrated with the mass flow sensor in a mass flow controller (MFC). The mass flow controller can be electrically coupled to the diaphragm, barometric sensor or other components of the system. Referring to FIG. 5, a system 500 is shown comprising an inlet 505, mass flow controller 510, a pump 520, a barometric sensor 530, and an exit port 540. The inlet 505 is fluidically coupled to the mass flow controller 510 through a fluid line 506. The mass flow controller 510 is fluidically coupled to the pump 520 through a fluid line 512. The pump 520 is fluidically coupled to an exit port 540 through a fluid line 522. The mass flow controller 510 is electrically coupled to the pump 520 and the barometric sensor 530 through interconnects (dashed lines in FIG. 5). The mass flow controller 510 typically comprises a mass flow sensor, a processor and one or more memory units. Other components discussed below in connection with a processor or computer system may also be present in the mass flow controller 510. The pump 520 is controlled by the MFC 510 based on the MFC 510 determining the number of moles of air pulled through the trap using measurements from the mass flow sensor of the MFC 510 and/or any corrections from measurements by the barometric sensor 530. In certain instances, the pumping rate of the pump 520 is adjusted to ensure the correct volume is drawn through the trap independent of restriction and/or based on correction factors from measurements of atmospheric pressure and temperature by the barometric sensor 530. The actual volume of air drawn through the trap can be determined using the MFC 510. For example, the measured mass flow from the mass flow sensor of the MFC 510 can be converted to volume by the MFC 510 by correlating the mass flow sensor measurements to actual volume of air and/or by using correction factors from measurements by the sensor 530. The calibration includes, for example, the atmospheric pressure and temperature collected from the barometric sensor 530 and any correction factor based on, for example, the ratio described above in connection with FIG. 2. The atmospheric pressure and temperature can be continuously monitored by the MFC 510 (using measurements from the barometric sensor 530) to permit an accurate determination of the molar volume being pulled through the trap. Such calculations may be particularly beneficial where trap restriction varies or where pressure or elevation varies significantly at different sampling times. The actual mass drawn through the trap can be based on volume not pumping time or flow rate through the system 500. For example, the MFC 510 can be configured to operate the pump 520 for the appropriate amount of time to load the specified volume onto the trap. Once the appropriate volume is loaded onto the trap, the MFC 510 can switch the pump 520 off or can fluidically decouple the trap from the pump 520 by actuating a valve or other internal component (not shown) to a position which stops fluid flow between the trap and the pump 520. The actual pumping rate implemented by the MFC 510 can change or may be constant during loading of the trap. In some examples, the MFC 510 controls the pump 520 to provide a certain loaded volume onto the trap within a selected time. To reach such selected times, the MFC 510 can use the mass measured by the mass flow sensor of the MFC 510, apply any correction factor based on measurements from the sensor 530 and adjust the pumping rate to achieve the target time. If variable restriction is encountered during the loading of the trap, the MFC 510 can adjust the pumping rate to account for the variable restriction. By using the MFC 510 and the sensor 530, the actual volume of air pulled through the trap by the pump 520 is more accurate and reproducible even with changing pressure, temperature and flow restriction.

In certain examples, the systems described herein typically implement closed loop control to load sample into the trap. For example, a flow rate of the pump can be set to a first flow rate, e.g., 50 mL/min. The system can determine the volume of air being pulled through the pump and adjust the pumping rate to achieve a desired volume flow through the pump. Many existing pumps use pressure values, and if the restriction changes during pumping, there is no way to determine that the volume of air being pulled through the system is inaccurate. By implementing closed loop control, more accurate volumes of air can be drawn through the traps. The exact pumping rate of the systems described herein can vary from about 1 mL/min to about 250 mL/min. The mass flow sensor or controller can be selected to be operable over a desired pumping rate. The exact total volume of air drawn through each trap van vary from about 50 mL to about 3 liters (depending on the size of the trap), more particularly about 1 liter to about 2 liters can be drawn through the trap. Higher or lower volumes of air can be drawn through the trap if desired.

In certain configurations, the type of pump used in the systems described herein can also vary. Positive displacement pumps, momentum transfer pumps, regenerative pumps, or entrapment pumps can be used. For example, the pump may be a rotary vane pump, a diaphragm pump, a liquid ring pump, a piston pump, a scroll pump a screw pump, a Wankel pump, an external vane pump, a booster pump, a lobe pump, or other suitable types of pumps. Diaphragm pumps are used in many instances because they are highly efficient, e.g., up to about 97% efficient, and can be sized and arranged to fit into a small form factor system that is portable and can be carried from site to site by a single person. In some configurations, the pump may have enough power to provide a high pressure drop, e.g., 7 psi or more, without any damage to the pump. Similarly, the barometric sensors used in the systems described herein may vary and typically any barometric sensor which can be fluidically coupled to atmosphere, e.g., through a port in the housing, can be electrically coupled to a processor and used in the systems described herein.

Figure 6:
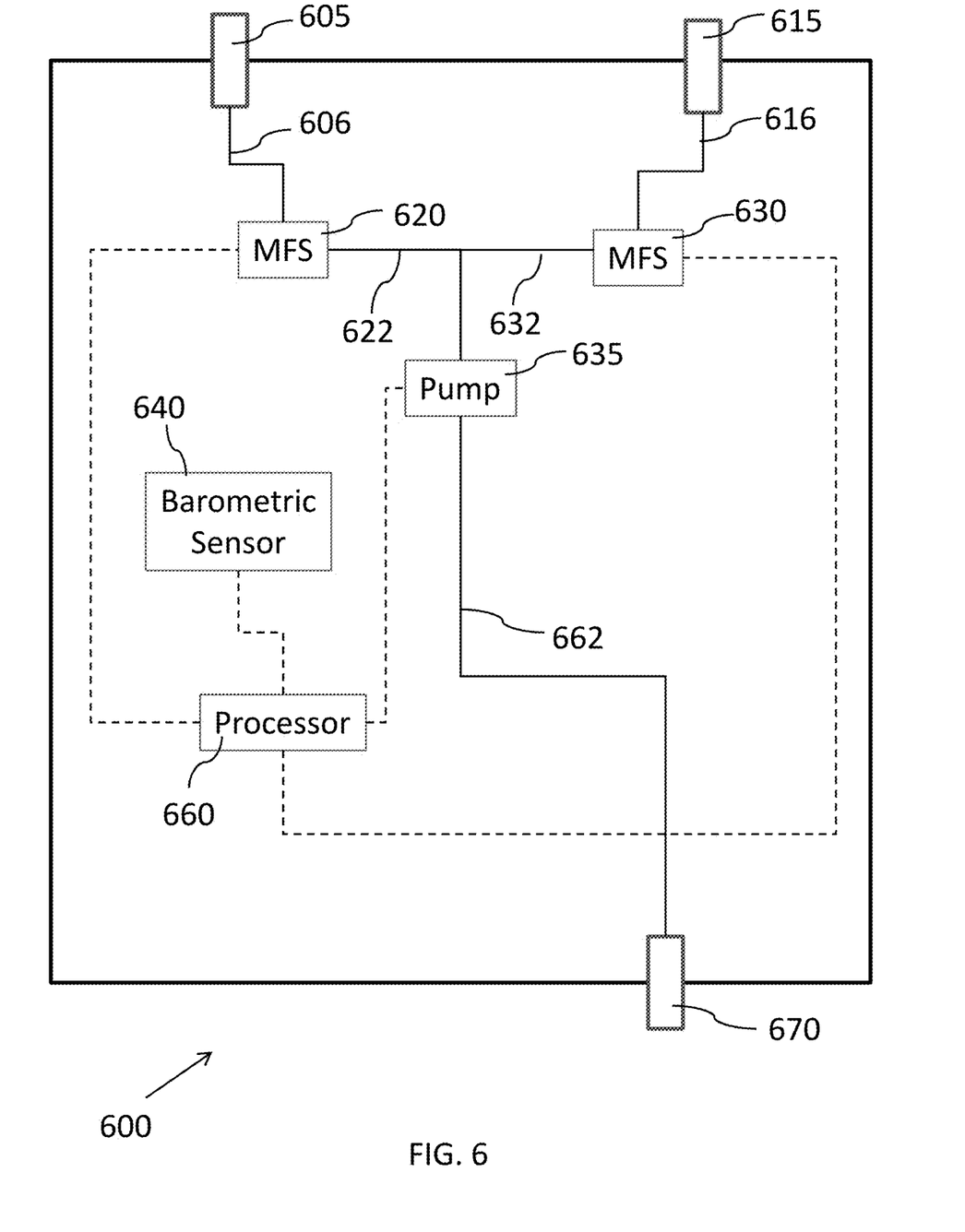
FIG. 6 is an illustration of system comprising more than a single inlet, in accordance with certain examples.

In certain embodiments, the systems described herein can be used to load sample into two or more traps simultaneously. For example, the system may comprise more than a single inlet each of which can fluidically couple to a respective trap. Each inlet may comprise a respective mass flow sensor to measure mass flow in an air sample drawn through each trap. Referring to FIG. 6, a system 600 is shown that comprises a first inlet 605 fluidically coupled to a mass flow sensor 620 through a fluid line 606. The system 600 also comprises a second inlet 615 fluidically coupled to a mass flow sensor 630 through a fluid line 616. Each of the mass flow sensors 620, 630 is also fluidically coupled to a pump 635 through fluid lines 622, 632, respectively. While a single pump 635 is shown in FIG. 6, more than one pump can be present if desired. A barometric sensor 640 is fluidically coupled to atmosphere to measure local pressure and temperature. If desired, a second barometric sensor (not shown) may also be present. Each of the mass flow sensors 620, 630, the barometric sensor 640 and the pump 635 are electrically coupled to a processor 660 through various interconnects (dashed lines in FIG. 6). An exit port 670 is fluidically coupled to the pump 635 through a fluid line 662. The pump 635 can be switched on (or may already be switched on) by the processor 660 and the pump time, flow rate, etc. are controlled by the processor 660 based on the processor 660 determining the number of moles of air provided through the traps (not shown) coupled to the inlets 605, 615 using measurements from the mass flow sensors 620, 630 and the barometric sensor 640. In certain instances, the pumping rate of the pump 635 is adjusted to ensure the correct volume is drawn through the traps independent of restriction. Where values from the mass flow sensors 620, 330 differ, the processor 660 can determine what particular flow rate should be used so the average corrected volume of air drawn through each trap is achieved or the processor 660 can adjust the pump 635 so that a minimum air volume is drawn through each trap even though more air than necessary may be drawn through one of the traps. For example, the measured mass flow from the mass flow sensors 620, 630 can be converted to volume by the processor 660 by correlating the mass flow sensor measurements to actual volume of air. The calibration includes, for example, the atmospheric pressure and temperature collected from the barometric sensor 640 and any correction factor needed based on the measured pressure and temperature by the sensor 640. The atmospheric pressure and temperature can be continuously monitored by the processor 660 and the sensor 640 to permit an accurate determination of the molar volume being pulled through the traps. Such calculations may be particularly beneficial where trap restriction varies or where pressure or elevation varies significantly at different sampling times. The actual mass drawn through the traps can be based on volume not pumping time or flow rate through the system 600. For example, the processor 660 can be configured to operate the pump 635 for the appropriate amount of time to load the specified volume onto the traps. Once the appropriate volume is loaded onto the traps, the processor 660 can switch the pump 635 off or can fluidically decouple the traps from the pump 635 by actuating a valve or other internal component (not shown) to a position which stops fluid flow between the traps and the pump 635. The actual pumping rate implemented by the processor 660 can change or may be constant during loading of the traps. In some examples, the processor 660 controls the pump 635 to provide a certain loaded volume onto or drawn through the traps within a selected time. To reach such selected times, the processor 660 can use the mass measured by the mass flow sensors 620, 630, the pressure and temperature measured by the barometric sensor 640 and adjust the pumping rate to achieve the target time. If variable restriction is encountered during the loading of the traps, the processor 660 can adjust the pumping rate to account for the variable restriction. By using the mass flow sensors 620, 630 and the barometric sensor 640, the actual volume of air pulled through the traps by the pump 635 is more accurate and reproducible even with changing pressure, temperature and flow restriction.

In certain configurations, while the systems described herein are generally configured to draw air through a trap using a negative pressure, e.g., using a vacuum produced by a pump to draw air through the system, operation of the system can be reversed to push air through the traps instead. For example, the exit ports can become inlet ports to force air through the system in a reverse direction. This reverse direction still permits loading of the traps in a similar manner except the traps become coupled to an exit port of the system. The pump then provides a positive pressure to force air through the trap and load analyte material in an air sample onto sorbent material in the trap. The systems described herein may also be used to fill a bladder or other device with a specific amount of a material. For example, the presence of the mass flow controller can permit a certain amount of a chemical species (or a certain volume of the species) to be loaded into the bladder or other device for subsequent use.

In certain embodiments, the systems described herein are typically used in combination with a needle trap. While needle traps can be configured in various manners, the needle trap typically comprises a sorbent material packed into the interior of the trap. The sorbent material is designed to adsorb and desorb analyte materials. For example, the sorbent material can adsorb the analyte materials at a first temperature, and then the trap can be heated to a higher temperature to cause desorption of the analyte from the trap. The desorbed materials can then be provided to a detection system, chromatography system or other devices for analysis. The needle trap typically comprises an inlet, an outlet, and an internal channel between the inlet and the outlet that comprises the sorbent material. The exact number of sorbent materials may vary from one, two, three or more. In particular, the needle trap may comprise two or more different sorbent materials with different strengths to permit adsorption of a wide number of analyte species. The needle trap may comprise one or more fittings to permit coupling of a cap to the trap to seal the interior of the trap and assist in retention of the loaded analyte on the trap prior to analysis.

In certain examples, the systems described herein may comprise a user interface. For example and referring to FIG. 7, a system 700 comprises an inlet 710 on a housing 705. The housing 705 comprises a display screen 720, an on/off button 730 and an entry pad 740. While not shown, inside the housing 705 is a mass flow sensor or controller, a pump, a barometric sensor and other components as described herein. The on/off button 730 can be used to power system 700 on and off. The entry pad 740 can be used to navigate through various menus displayed on the screen 720 to permit a user to select initial settings for the system 700. The display screen 720 can be configured to display various parameters including, but not limited to, date, time, battery life in the case where a battery power source is used, etc. The screen 720 may also display the status of any Bluetooth, GPS device, altitude sensor, etc. present in the system 700. In some instances, the Bluetooth device permits the system 700 to communicate with a mobile device such as a tablet, cellular phone, laptop computer, etc. In other instances, the Bluetooth device (or other wireless device) can be used to communicate with an external barometric sensor mounted on the system 700. The GPS device can be used to track the location of air sampling operations and correlate that location to particular needle traps, e.g., to correlate a serial number or bar code on a needle trap to a particular sampling locations. An altitude sensor can be present to permit loading of materials onto a trap at the same geographic coordinates but at different altitudes. Such a configuration may be particularly useful for air quality monitoring from industrial sites. The screen 720 permits the user to select from various options displayed in a user interface. For example, the user interface allows the operator to select either Time and Flow rate, Time and Volume or Flow rate and Volume. The last setting selection is unique to the systems described herein. By allowing the end user to select a setting of flow rate and volume, this setting permits the pump to run until the correct volume of air has been pulled through a trap coupled to the inlet 710. As discussed herein, quantitation is based on volume not time or flow rate. By allowing time to float the pump of the system 700 will run for the appropriate amount of time to get the specified volume. This result can occur independently of the actual flow. For example, if the restriction on the inlet 710 of the system 700 is too great for the pump to reach the set flow it still does not negatively affect the accuracy of the volume collected. The pump will run for sufficient time to reach the target volume making up for the lower flow rate. The device may comprise on-board storage, e.g., one or more memory units, hard drives, memory chips, etc. which can be fixed or may be removable. The on-board storage may comprise one or more routines or methods which can be selected by a user. After selection of a particular method, the parameters of the method can be displayed on the screen 720 prior to the user initiating the method. For example, default parameters may include delay time (time to wait before the pump starts), flow, volume, repetitions (number of times the pump will run), wait time (time between pump runs), etc. If a user selects flow and volume, then the pumping time can be adjusted by the processor of system 700 so the selected criteria are satisfied.

Figure 7:
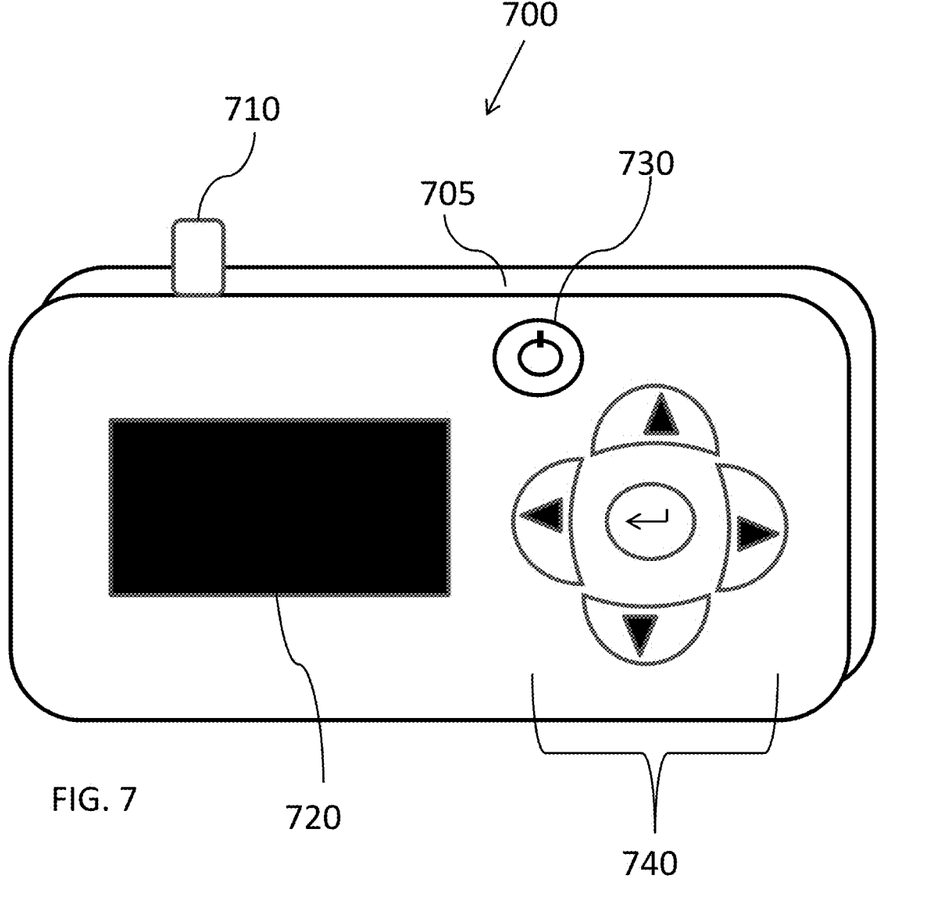
FIG. 7 is an illustration of a device configured to load analyte on a trap, in accordance with certain configurations.

As noted herein, the processor may readjust the various parameters based on mass flow sensor measurements and/or barometric sensor measurements to achieve a desired flow and volume. Since the pump uses closed loop control it may take some initial time to adjust the flow rate when the pumping begins. This delay generally does not have a negative effect on quantitation since the mass flow sensor can be used to collect the desired volume based on measurements by the system 700. If desired, the screen 720 may display any or more of the parameters described herein during the sampling operation. Further, the remaining battery life or other remaining power can be displayed if desired.

In certain embodiments, the system 700 can be controlled remotely from a mobile device separate from the system itself. For example, the system 700 may comprise an internal antenna or Bluetooth device which can be used to pair the device with a laptop computer. Once paired, the system 700 can be controlled from the laptop computer. Remote control of the system 700 may be desired where the sampling environment is toxic or hazardous or is generally not user accessible, e.g., where sampling occurs downhole in bore drilling applications.

In some instances, the system 700 may comprise a cellular or satellite connection which can pair with a remote system and permit a remote user to operate the sampling system 700. For example, in sampling systems mounted or used with vehicles such as military vehicles, aerial vehicles (planes, drones, unmanned aerial vehicles, etc.), satellites, weather balloons or other devices and systems which are mobile, a sampling system can be mounted or attached to the device and used to sample the local air environment of the device. If desired, the device can include one or more robotic arms to permit the device to exchange a first trap with a second trap. Alternatively, the vehicle may comprise a plurality of individual sampling systems (coupled to a respective trap) which can be switched on at different times to sample the air at different intervals without the need to change the traps. The closed loop control described herein may be particularly desirable for use in upper atmospheric sampling, extraterrestrial sampling and in extreme pressure sampling often encountered in sub terrain measurements. The vehicles used with the sampling systems may comprise a motor or engine, which can be powered by a fuel source including propane, methane, gasoline, diesel fuel, etc., may comprise an electric motor or may comprise other devices to power the vehicle. The power source used to power the vehicle can also be used to power the sampling system without the need for the sampling system to include its own power source. In some examples, an additional power source can be used to power the sampling system including, for example, an alternating current source, a direct current source, a battery, a fuel cell, a wind turbine, a hand crank generator, a solar cell or other devices.

In certain instances, the sampling systems described herein can be used in combination with engines to monitor the state of the engine. For example, as an engine uses a fuel source, exhaust gas is produced. The exhaust gas can be sampled inline by the systems described herein by trapping a portion of the exhaust air onto the trap. The trapped materials can then be analyzed to determine whether the engine is operating properly, needs servicing, meets environmental regulations, etc. In-line sampling may also be performed in connection with industrial exhaust or waste generation to monitor materials in air samples which are produced as a result of industrial processes. Such trapping may be particularly useful in compliance monitoring applications.

Figure 8:
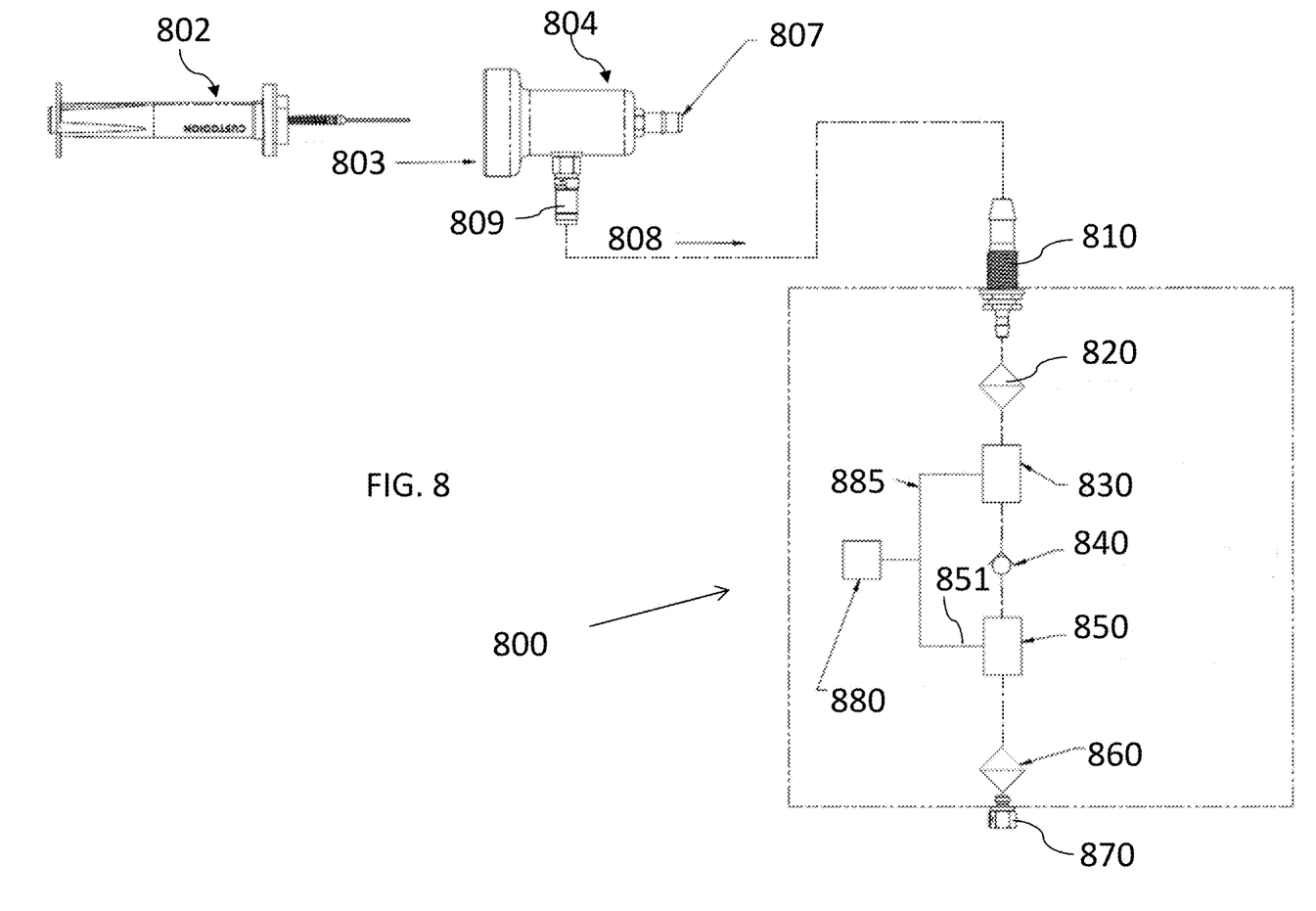
FIG. 8 is an illustration of a system comprising an internal filter, in accordance with certain examples.

In certain embodiments, the systems described herein may comprise additional internal components as desired. For example, one or more filters, fittings, valves, etc. can be present within the system as desired. Referring to FIG. 8, a system 800 for use with a needle trap 802 and an interface 804 is shown. The needle trap 802 is configured to couple to the interface 804 in the direction of arrow 803. The interface 804 comprises an air inlet 807 and a fitting 809 configured to couple to the inlet 810 of the system 800. Air flows through the interface 804, through the needle trap 802, through the fitting 809 and through the inlet 810 in the general direction shown by arrow 808. The system 800 also comprises a filter 820 fluidically coupled to the inlet 810, a mass flow sensor 830, fluidically coupled to the inlet 810 and a check valve 840, and a diaphragm 850 fluidically coupled to the check valve 840 and a second filter/breather 860. The filter 860 can be fluidically coupled to an exit port 870. A barometric sensor 880 can be fluidically coupled to the external atmosphere to provide for the closed loop control using a flow rate control loop 885 as discussed herein. The filters/breathers 820, 860 can be used to filter out particulate matter from the air sample to avoid damage to the other components within the system 800. While the needle trap 802 is shown as being separate from the interface 804, the two components can be integrated if desired. The fitting 809 may couple to the inlet 810 using a friction fit or using fittings such as ferrules, compression nuts, etc. In some instances, the fitting 809 plugs into the inlet 810 and a fluid tight seal between them is provided to draw air into the needle trap 802 using the system 800.

In certain embodiments, the sampling systems described herein may comprise on board components or circuity including, for example, a microprocessor and/or suitable software for sampling operations. As noted herein, the processor can be integral to the sampling system or can be external and part of a different system. The processor can be used, for example, to control the pumping rate, pump on time, etc. The processor is typically electrically coupled to one or more memory units to receive data from sensors, compare that data to one or more calibration routine or set points in the memory and permit adjustment of the various system parameters. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects of the systems and methods may be implemented as specialized software executing in a general-purpose computer system. The computer system may include a processor connected to one or more memory devices, such as a disk drive, memory, or other device for storing data. Memory is typically used for storing programs, calibrations and data during operation of the sampling system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the sampling systems. The processor typically is electrically coupled to a power source which can vary, for example, from an alternating current source, a direct current source, a battery, a rechargeable battery, an electrochemical cell, a fuel cell, a solar cell, a wind turbine, a hand crank generator, an alternating current source as, for example, 120V AC power or 240V AC power. The system may also include one or more input devices, for example, a keyboard, mouse, trackball, microphone, touch screen, manual switch (e.g., override switch) and one or more output devices, for example, a printing device, display screen, speaker. In addition, the system may contain one or more interfaces that connect the computer system to a communication network (in addition or as an alternative to the interconnection device). The system may also include suitable circuitry to convert signals received from the sensors and/or other components of the system. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, WiFi, Near Field Communication or other wireless protocols and/or interfaces.

In certain embodiments, the storage system typically includes a computer readable and writeable nonvolatile recording medium in which codes can be stored that can be used by a program to be executed by the processor or information stored on or in the medium to be processed by the program. The medium may, for example, be a disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. For example, the processor may receive signals from the sensors and use those signals to adjust the pumping rate. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known Pentium class processors available from the Intel Corporation. Many other processors are available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

Figure 9:
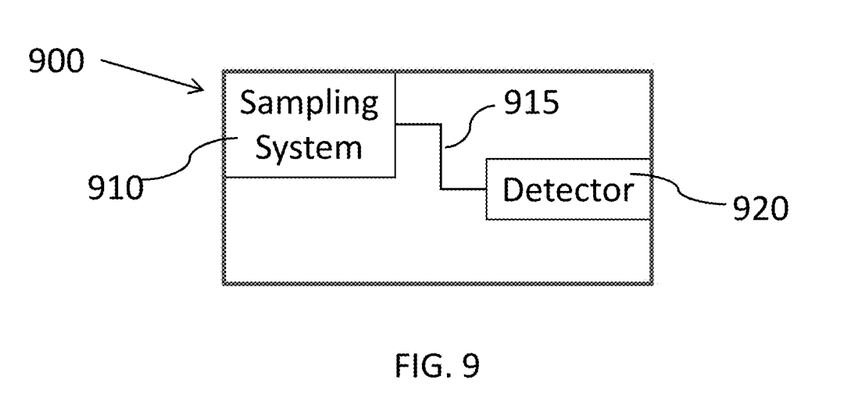
FIG. 9 is an illustration of a system comprising a detector or other component, in accordance with certain examples.

In certain examples, the sampling systems described herein may be present on or in an instrument which comprises another device or system. A simplified schematic is shown in FIG. 9. The instrument 900 comprises a sampling system 910 which may be fluidically coupled to a detector or other component 920 through a fluid line 915. In some examples, the fluid line 915 is absent and the sampling system and detector (or other components) are not directly connected to each other. The sampling system 910 may be a suitable sampling system as described herein. The detector 920 or other component may take many different forms. For example, the detector 920 may comprise an inlet configured to fluidically couple to the trap to receive analyte trapped on the trap and which is desorbed from the trap and provided to the detector. The sampling system 910 can be used to load the trap, which is then removed and coupled to the detector 920. The detector 920 may take the form of many different types of detectors including, for example, a mass spectrometer optionally coupled to a gas chromatography device or other type of chromatography device. In some examples, the detector 920 can be replaced with a thermal desorption system comprising an inlet configured to fluidically couple to the trap to receive analyte trapped on the trap and which is desorbed from the trap by the thermal desorption system. Other types of detectors such as flame ionization detectors, thermal conductivity detectors, etc. may be present in the system 900 as well.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A system configured to draw air through a trap to load analyte in an air sample onto the trap, the system comprising:
    a pump configured to fluidically couple to the trap through a fluid flow line and configured to draw the air sample through the trap;
    a mass flow sensor fluidically coupled to the fluid flow line and configured to measure mass flow in the air sample drawn through the trap; and
    a controller electrically coupled to the pump and the mass flow sensor, the controller configured to provide closed loop control of the pump from mass flow measurements by the mass flow sensor to draw a selected volume of the air sample through the trap, wherein the controller is calibrated to convert a measured mass of air to volume to draw a selected molar volume of the air sample through the trap and load analyte onto sorbent material in the trap without considering a pumping time of the pump.

2. The system of claim 1, in which the controller is configured to correct mass flow measurements using atmospheric pressure and temperature during operation of the pump.

3. The system of claim 2, in which the controller is configured to adjust a pumping rate of the pump using the mass flow measurements corrected using atmospheric pressure and temperature.

4. The system of claim 2, in which the controller is configured to automatically adjust a pumping rate of the pump using the mass flow measurements corrected using atmospheric pressure and temperature to provide the selected molar volume of the air sample to be drawn through the trap.

5. The system of claim 4, in which the selected molar volume of the air sample drawn through the trap is determined without measuring a pressure change in the system.

6. The system of claim 5, in which the controller is configured to compare the mass flow measurements to a calibration table to determine the selected molar volume drawn through the trap.

7. The system of claim 1, further comprising a barometric sensor electrically coupled to the controller.

8. The system of claim 7, in which the controller is configured to determine atmospheric pressure and temperature using the barometric sensor and alter a pumping rate of the pump using the determined atmospheric pressure and temperature and the mass flow measurements.

9. The system of claim 8, in which the controller is configured to fluidically decouple the pump from the trap after the selected molar volume of the air sample has drawn through the trap.

10. The system of claim 8, in which the controller is configured to discontinue pumping of the pump after the selected molar volume of the air sample has been drawn through the trap.

11. The system of claim 1, further comprising a wireless device electrically coupled to the controller.

12. The system of claim 11, in which the wireless device comprises a Bluetooth device or an antenna.

13. The system of claim 11, further comprising a power source selected from the group consisting of an alternating current source, a direct current source, a battery, a rechargeable battery, an electrochemical cell, a fuel cell, a solar cell and a hand crank generator.

14. The system of claim 1, further comprising a display screen electrically coupled to the controller.

15. The system of claim 14, in which the controller is configured to provide a summary of operation on the display comprising at least one of total time, pump time, total volume, average volume, repetitions and pump status.

16. The system of claim 1, in which the controller is configured to permit operation of the pump for a selected period based on at least one of time, flow and volume through the mass flow sensor to draw the selected molar volume of the air sample through the trap.

17. The system of claim 1, further comprising a user interface configured to receive an indication from a user to operate the controller in one of a plurality of modes.

18. The system of claim 17, wherein the user interface is configured to allow the user to indicate one or more of the following:
    a time and a flow rate associated with a first mode of the plurality of modes;
    a time and volume associated with a second mode of the plurality of modes; and a flow rate and a volume associated with a third mode of the plurality of modes.

19. A system configured to draw air through a trap to load analyte in an air sample onto the trap, the system comprising:
- a pump configured to fluidically couple to the trap through a fluid flow line and configured to draw the air sample through the trap;
- a mass flow sensor fluidically coupled to the fluid flow line and configured to measure mass flow in the air sample drawn through the trap; and
- a controller electrically coupled to the pump and the mass flow sensor, the controller configured to provide closed loop control of the pump from mass flow measurements by the mass flow sensor to draw a selected molar volume of the air sample through the trap, in which the controller is configured to load the selected molar volume of the air sample through the trap based on the mass flow measurements and without considering a flow rate of the pump, wherein the flow rate through the pump is variable when drawing the selected molar volume through the trap to load the analyte onto sorbent material of the trap.

20. A system configured to draw air through a trap to load analyte in an air sample onto the trap, the system comprising:
- a pump configured to fluidically couple to the trap through a fluid flow line and configured to draw the air sample through the trap;
- a mass flow sensor fluidically coupled to the fluid flow line and configured to measure mass flow in the air sample drawn through the trap; and
- a controller electrically coupled to the pump and the mass flow sensor, the controller configured to provide closed loop control of the pump from mass flow measurements by the mass flow sensor to draw a selected molar volume of the air sample through the trap, in which the controller is configured to load the selected molar volume of air sample through the trap based on the mass flow measurements and without considering a pumping time of the pump, wherein the pumping time of the pump is variable when drawing the selected molar volume through the trap to load the analyte onto sorbent material of the trap.

* * * * *